United States Patent [19]

MacMinn et al.

[11] Patent Number: 4,772,839
[45] Date of Patent: Sep. 20, 1988

[54] ROTOR POSITION ESTIMATOR FOR SWITCHED RELUCTANCE MOTOR

[75] Inventors: Stephen R. MacMinn; Peter B. Roemer, both of Schenectady, N.Y.

[73] Assignee: General Electric Company, Schenectady, N.Y.

[21] Appl. No.: 113,048

[22] Filed: Oct. 27, 1987

[51] Int. Cl.[4] .............................................. H02P 8/00
[52] U.S. Cl. .................................... 318/696; 318/685
[58] Field of Search ...................... 318/696, 685, 561; 364/483

[56] References Cited

U.S. PATENT DOCUMENTS

| | | | |
|---|---|---|---|
| 4,315,316 | 2/1982 | Boron et al. | 364/483 |
| 4,520,302 | 5/1985 | Hill et al. | 318/696 |
| 4,611,157 | 9/1986 | Miller et al. | 318/696 |
| 4,642,543 | 2/1987 | MacMinn | 318/696 |
| 4,680,518 | 7/1987 | Kurakahe et al. | 318/561 |
| 4,691,152 | 9/1987 | Ell et al. | 318/561 X |

OTHER PUBLICATIONS

"Detection of Rotor Position in Stepping and Switched Motors by Monitoring of Current Waveforms" *IEEE Transactions on Industrial Electronics*, vol. IE-32 No. 3, Aug. 1985, pp. 215–222.

*Primary Examiner*—William M. Shoop, Jr
*Assistant Examiner*—Saul M. Bergmann
*Attorney, Agent, or Firm*—Marvin Snyder; James C. Davis, Jr.

[57] ABSTRACT

An indirect position estimator for a switched reluctance motor applies short duration, low level sensing pulses to two unenergized phases of the motor. A change in phase current during a sampling period, resulting from the application of the sensing pulse, is sensed and processed to produce an indication of a pair of estimated angles for each of the unenergized phases. A pair of angles for one such unenergized phase is shifted by a value equal to the phase displacement between the two unenergized phases and the shifted angles are then compared to the angles of the second phase to determine which angles match. The matching angle is produced as a signal indicative of the estimated instantaneous rotor position. If any stator phase changes state during the sampling period, or if the two initially unenergized phases do not remain unenergized throughout the sampling period, a signal corresponding to an extrapolated rotor position is produced instead of the signal indicative of estimated instantaneous rotor position. Extrapolation preferably includes a least squares recursive estimation, with exponential forgetting, of speed.

15 Claims, 4 Drawing Sheets

ROTOR POSITION ESTIMATOR FOR SWITCHED RELUCTANCE MOTOR

BACKGROUND OF THE INVENTION

This invention relates in general to an apparatus and method for estimating position of a rotor of a variable reluctance drive operating without a shaft position sensor and, more specifically, to estimating rotor position from the inductance characteristics of unenergized stator phases.

Although they have been known for some time, interest in switched reluctance motor (SRM) drives has recently revived. Compared to conventional induction and synchronous motor drive systems, the SRM drive is simple in construction and economical. In addition, the converter which applies power to the SRM machine requires fewer power devices and, therefore, is more economical and reliable. In view of these advantages, the switched reluctance motor drive system provides an attractive alternative to conventional drive systems and it is expected to find wide popularity in industrial applications.

Switched reluctance motors conventionally have multiple poles or teeth on both the stator and rotor, i.e., they are doubly salient. There are phase windings on the stator but no windings or magnets on the rotor. Each pair of diametrically opposite stator poles is connected in series to form an independent phase of the multiphase switched reluctance motor.

Torque is produced by switching current on in each phase winding in a predetermined sequence that is synchronized with the angular position of the rotor, so that a magnetic force of attraction results between the rotor and stator poles that are approaching each other. The current is switched off in each phase before the rotor poles nearest the stator poles of that phase rotate past the aligned position; otherwise, the magnetic force of attraction would produce a negative or braking torque. The torque developed is independent of the direction of current flow so that unidirectional current pulses synchronized with rotor movement can be applied to the stator phase windings by a converter using unidirectional current switching elements such as thyristors or transistors.

The switched reluctance drive operates by switching the stator phase currents on and off in synchronism with rotor position. By properly positioning the firing pulses relative to rotor angle, forward or reverse operation and motoring or generating operation can be obtained.

Usually, the desired phase current commutation is achieved by feeding back a rotor position signal to a controller from a shaft position sensor, e.g. an encoder or resolver. For cost reasons in small drives and reliability reasons in larger drives and to reduce size, weight, and inertia in all such drives, it is desirable to eliminate this shaft position sensor.

To this end, various approaches have previously been proposed for indirect rotor position sensing by monitoring terminal voltages and currents of the motor. One such approach, referred to as waveform detection, depends upon back electromotive forces and is therefore unreliable at low speeds and inoperative at zero speed.

Commonly assigned U.S. Pat. Nos. 4,611,157 and 4,642,543 describe work that has been done on dynamically stabilizing switched reluctance drives by feeding back the average D.C. link current rather than shaft position. Such controllers are limited by the average nature of their feedback information and by the tendency to jitter at start-up. While useful for fan and blower type applications, these controllers are not applicable to servo type applications where precise speed and/or position control is required.

U.S. Pat. No. 4,520,302 for "Stepping Motors and Drive Circuits Therefor" recognizes that the inductance of a phase winding is dependent on rotor position and varies substantially sinusoidally from a maximum to a minimum as the rotor advances over a pole pitch. According to this patent, the variation of inductance causes corresponding variation in certain characteristics of phase current flow which can be monitored to derive an indirect indication of rotor position. The current flow through an energized or unenergized phase winding may be monitored. In the case of a chopper type drive circuit, the characteristic of current flow that is measured may be current rise time, current decay time or the chopping frequency. Although various implementations are suggested in this patent, they all appear to involve a search for a known, e.g. minimum, inductance value based on measured phase current changes and any ambiguity in detected position for the target inductance is eliminated by considering whether the current flow characteristic being monitored is increasing or decreasing with rotor position. (Reference column 6, lines 62-65 and column 8, lines 12-19.) This ambiguity resolving approach assumes that the motor is moving in a given direction. Accordingly, it would not appear to be effective when the motor is starting from standstill. This latter limitation is particularly significant in servo drive systems where one cannot tolerate having the drive jiggle when it is started.

The indirect rotor position estimating and feedback approach of U.S. Pat. No. 4,520,302 is further discussed in a paper entitled "Detection of Rotor Position in Stepping and Switched Motors by Monitoring of Current Wave Forms" published in the *IEEE Transactions on Industrial Electronics*, Vol, IE-32, No. 3, August 1985 at pages 215-222. In an application of their approach to a ministep drive, the authors of this paper recommend monitoring of the chopping characteristic of phase current in both unexcited phases of a four-phase motor. The authors state that this is important "because the slope of each inductance/position characteristic approaches zero at one end of the position range." At intermediate points in the range, this prior approach apparently relies upon the predetermined direction of motor rotation to resolve ambiguities with respect to rotor position.

In switched reluctance motors, unlike ministep drives, there are not always two unexcited stator phases which can be monitored. Further, there are occasions when it is essential to ascertain rotor position without knowing, or being able to assume, the direction of rotor rotation, e.g. when starting a servo drive. A need thus persists for a method and implementing apparatus which can accurately estimate instantaneous rotor position in an SRM, irrespective of motor speed or direction and without resort to a rotor position sensor.

SUMMARY OF THE INVENTION

In accordance with the present invention, this need is fulfilled and the shortcomings of the prior art overcome by an indirect rotor position estimating method which simultaneously measures changes in current on two idle phases, processes the measurements to provide a pair of possible rotor angles for each such phase, and combines the angles in a fashion which yields a unique estimate of instantaneous rotor position. If two phases of the SRM do not remain unenergized throughout the sampling period or if any phase of the motor experiences a change of state during the sampling period, the present invention provides an extrapolated rotor position in place of the estimated instantaneous rotor position. Preferably, the extrapolation involves a recursive least squares estimation with exponential forgetting process for determining rotor speed.

Apparatus for implementing the method of the present invention includes impedance sensing control logic to determine which stator phases of an SRM are presently unenergized and to apply a sampling pulse to each of the unenergized phases. The sampling pulse has a short duration, resulting in negligible build-up of phase current and negligible motion of the rotor. The application of the sampling pulse results in a change in current in each of the unenergized phases. The change in current over a defined sampling period is sensed by a current sensor associated with each unenergized phase. From the sensed change in current, an estimated inductance value is derived for each unenergized phase and, either directly or from estimated inductance values derived therefrom, a pair of estimated rotor angles corresponding to the estimated inductance value for each of the unenergized phases is ascertained. An angle combiner shifts a pair of estimated angles associated with one such unenergized phase by a value equal to a known phase displacement of a second such unenergized phase, and compares the shifted pair of estimated angles with the pair of estimated angles for the second such phase to determine which of the angles match. An estimated instantaneous rotor angular position equal to the matching angle is produced. An extrapolator generates an extrapolated rotor angular position and produces an output signal representing the extrapolated rotor position in place of the estimated instantaneous position if any of the stator phases of the motor undergoes a change in state during the sampling period of if the two unenergized phases of the motor do not remain unenergized throughout said sampling period.

The above described apparatus can advantageously be implemented by a single microprocessor. In another aspect of the invention, the rotor position estimation apparatus can be combined with a controller and inverter to form a closed-loop control for a switched reluctance motor.

Accordingly, it is a principal object of the invention to provide a method and apparatus for indirectly estimating instantaneous rotor position which obviates the need for a rotor position sensor and alleviates the expense, reliability concerns, added weight and space requirements attendant thereto.

Another object of the present invention is to permit accurate measurement of rotor position through the terminals of the motor, allowing use of existing wiring for both energization of the motor and determination of rotor position.

Yet another object of the present invention is to provide a rotor position estimator which is effective regardless of motor speed or direction.

Further objects are to provide a rotor position estimator which supplies continuous and unambiguous position information in real time, accommodates phase coupling interference, is readily implemented in a microprocessor, and is particularly suitable for use in servo position and other high performance drive applications.

BRIEF DESCRIPTION OF THE DRAWINGS

These and other objects, features and advantages of the present invention will be more readily understood from the following detailed description when read in conjunction with the accompanying drawings in which.

DETAILED DESCRIPTION

Figure 1:
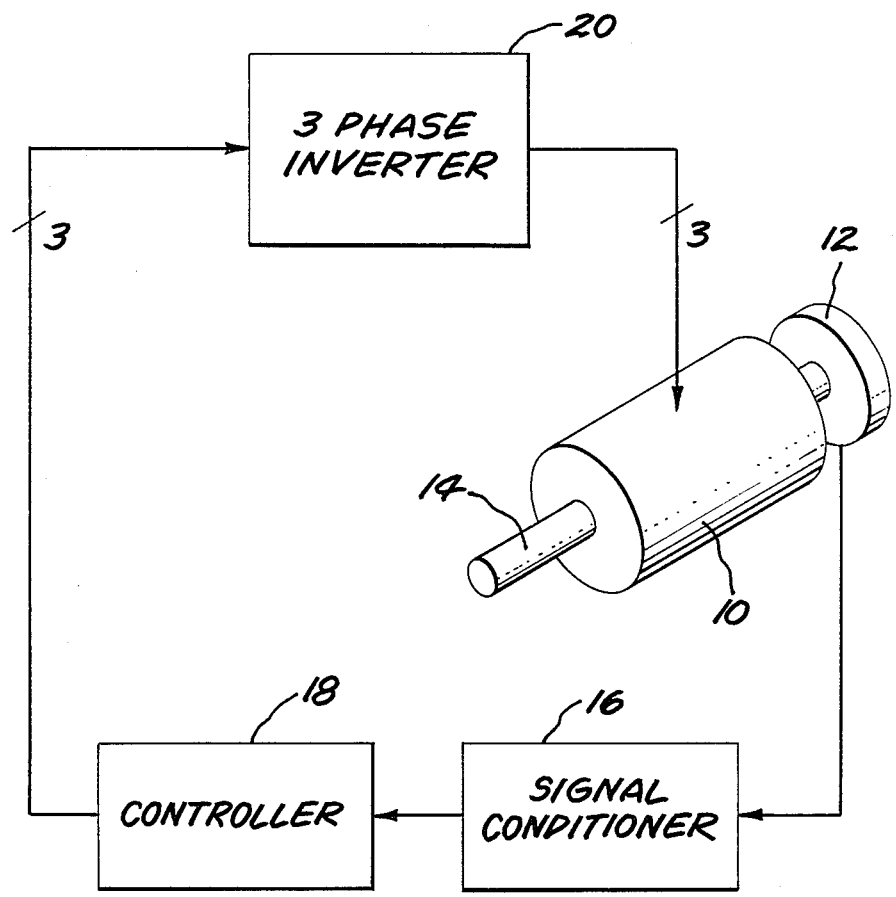
FIG. 1 is a block diagram depiction of a conventional SRM drive system employing a rotor position sensor.

FIG. 1 depicts a conventional drive system for a switched reluctance motor 10 typically employing a position sensor 12 for measuring the angular position of rotor 14. The output signal from position sensor 12 is conditioned in a signal conditioner 16 which supplies to a controller 18 an electrical signal representative of rotor angle. In well known fashion, controller 18 provides commutation signals to an inverter 20 which, in turn, produces drive signals for motor 10. Typically, current sensors coupled to a current regulator circuit (not shown) are employed to regulate the current provided to the motor.

In accordance with the present invention, the shaft position sensor and signal conditioner of the prior art system are eliminated and instead an estimated rotor angular position generated by a position estimator is provided as an input signal to the controller.

Because of the saliency in both the rotor and stator of a switched reluctance motor, the inductance seen from the terminals of the stator phase windings is a strong function of rotor position. Since one or more of the phase windings is switched off at any given time, it is possible to probe that winding with a low level signal and determine its input impedance. This information, together with knowledge of the functional relationship between inductance and position, makes it possible to determine the angular position of the rotor from electrical measurements only, eliminating the need for a shaft position sensor.

The instantaneous relationship between voltage v and current I, in a rotating machine is given by $$v = Ir + \frac{d\psi}{dt} \quad (1)$$

where $\psi$ represents flux linkage, or, in terms of current:

$$v = Ir + L\frac{di}{dt} + I\frac{dL}{dt} \quad (2)$$

where L is the machine inductance seen from the stator terminals, and r is the stator resistance. In the switched reluctance motor, since the inductance L is a function of position:

$$v = Ir + L\frac{di}{dt} + I\frac{dL}{d\theta}\cdot\frac{d\theta}{dt} \quad (3)$$

and since rotor speed $$\omega = \frac{d\theta}{dt},$$

then $$v = Ir + L\frac{di}{dt} + I\omega\frac{dL}{d\theta}. \quad (4)$$

In a phase immediately following turn-on, the phase current is small and so the IR drop and the back Emf terms in the above equation (4) are small. The terminal voltage relationship then reduces to:

$$v = L\frac{di}{dt}. \quad (5)$$

The general strategy used in this invention to estimate rotor position is to fire an unenergized phase for a time period short enough so that the buildup of current and the motion of the rotor are negligible. In this case, the phase inductance can be approximated by:

$$\hat{L} = v\frac{\Delta t}{\Delta I} \quad (6)$$

where the symbol " ^ " signifies an estimated value.

Using this estimate of inductance, the rotor position can be estimated as:

$$\hat{\theta} = G^{-1}(\hat{L}) \quad (7)$$

where
$$L = G(\theta) \quad (8)$$

The idea of using the slope of the initial current rise in an unenergized phase to determine inductance, and hence rotor position is known. However, applicants have discovered that in order to determine rotor position uniquely, when the direction of motor motion is not known, it is necessary to sample more than one phase. This is because the function $L = G(\theta)$ is not single valued; however, this function is periodic, so measurements from two phases are sufficient to determine the rotor position uniquely.

Figure 2:
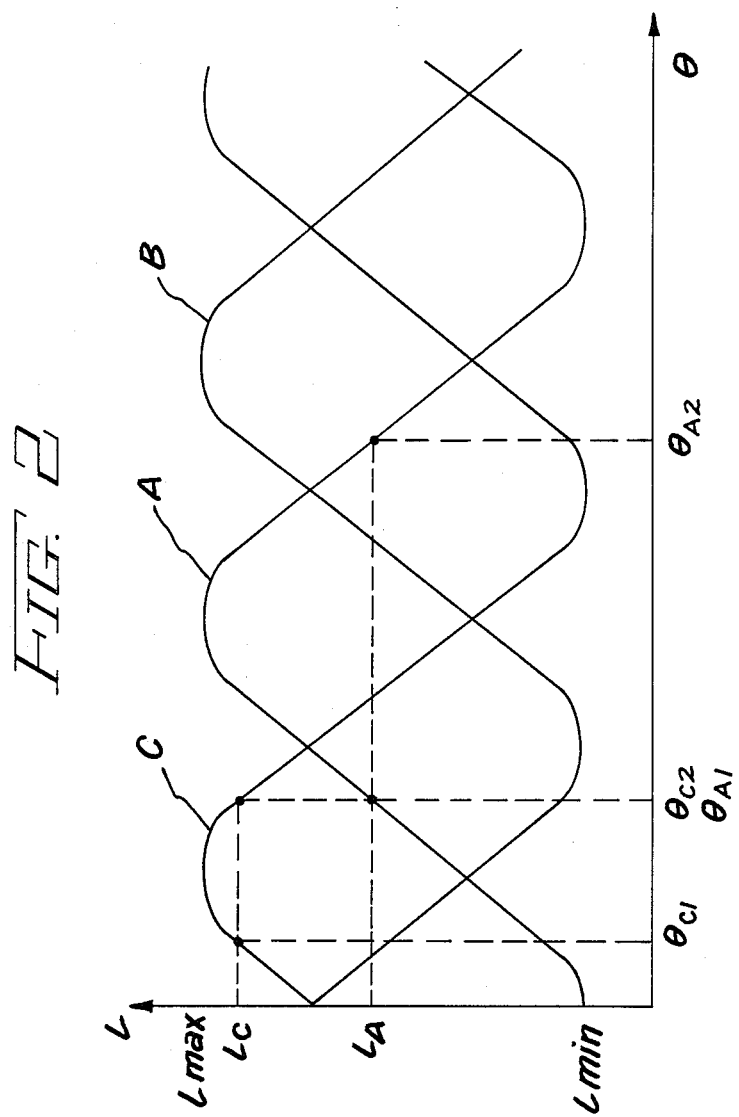
FIG. 2 is a waveform diagram depicting inductance as a function of rotor position for three stator phases.

FIG. 2 is a waveform diagram depicting phase inductance L as a function of rotor position $\theta$ for a three-phase SRM. The phases are labeled C, A and B and the inductance value associated with each of phases C, A and B, respectively, bears a corresponding subscript, although only $L_C$ and $L_A$ are shown in FIG. 2 since the Figure represents an instant when phases C and A are unenergized. As is readily apparent from FIG. 2, except at the extremes of the inductance waveform, for each phase there are two possible rotor angles associated with each inductance value, e.g. angles $\theta_{C1}$ and $\theta_{C2}$ with inductance value $L_C$. Accordingly, to establish a unique estimated rotor position, two measurements, on different phases, are combined. If, for example, at a particular instant the estimated inductance for unenergized phase C is $L_C$ and the estimated inductance value for unenergized phase A is $L_A$, then the pairs of estimated angles associated with these respective phases will be $\theta_{C1}$ and $\theta_{C2}$, and $\theta_{A1}$ and $\theta_{A2}$, respectively. As seen in FIG. 2, one of the phase A angles, i.e., $\theta_{A1}$, and one of the phase C angles, $\theta_{C2}$, will agree and the other angles will not. The matching angles represent the actual rotor position.

In practice, this angle combination step is accomplished by obtaining both angle estimates from both unenergized phases, shifting the angle estimates of one phase by the angular displacement between the phases and then comparing results to determine which angles match.

In a switched reluctance motor, there may be rotor positions where two stator phases are not free for sampling because the current in one phase is still decaying and the current in the other phase is still building up; in other words, only one phase, for example in a three-phase machine, is completely unenergized. Under such circumstances where two phases are not available for sampling, the present invention extrapolates the angle until sampling is again possible. As more fully described hereinafter, the preferred extrapolator uses a recursive least squares estimator with exponential forgetting to estimate rotor speed. If one of the active phases turns off during low level current sensing in the inactive phases, a noise spike occurs in the sensed signal. Accordingly, the present invention utilizes extrapolation whenever a change of state occurs in an energized phase during the current sampling period.

Figure 3:
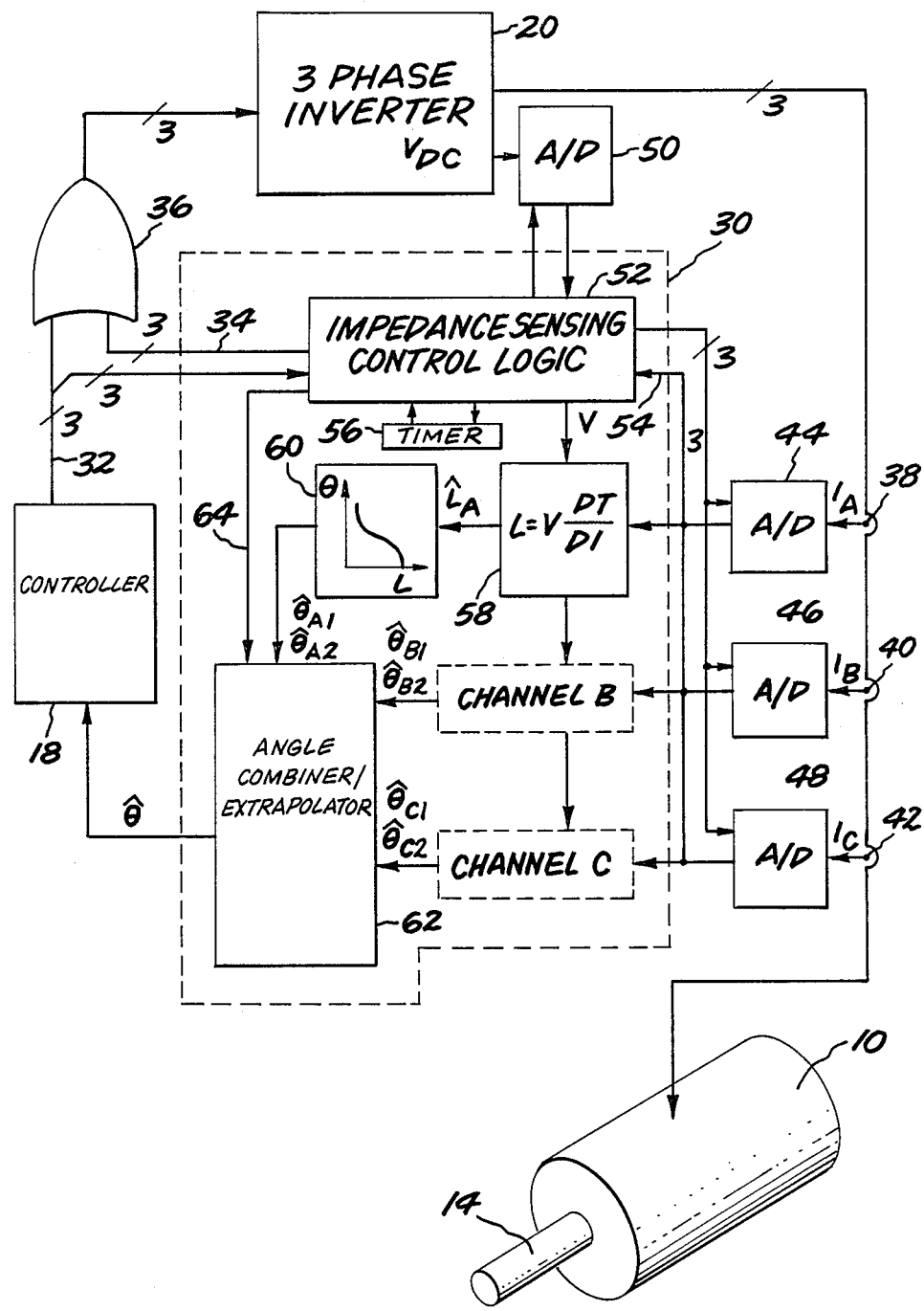
FIG. 3 is a block diagram depiction of an SRM control system incorporating a rotor position estimator constructed in accordance with the principles of the present invention.

A preferred embodiment of the position estimator 30 of the present invention is shown in FIG. 3, incorporated within a control system for an exemplary three-phase switched reluctance motor 10. This control system operates in the same basic fashion as previously described with reference to the prior art system of FIG. 1, except that controller 18 is provided with an estimated instantaneous rotor angle $\theta$ from position estimator 30, and inverter 20 is supplied, not only with commutation signals on line 32 from controller 18 but also with short duration, low level sensing pulses on line 34 from position estimator 30. The commutation commands on line 32 and the sensing pulses on line 34 are passed through an OR gate 36 before entering inverter 20. As more fully described hereinafter, the commutation commands are also monitored by control logic within position estimator 30.

With respect to the drawings, it should be noted that in the various figures, elements that are common are labeled with common reference numbers. Also for the sake of clarity of illustration, triple lines are sometimes depicted as a single line with a slash therethrough and the number 3 nearby.

As seen in FIG. 3, current sensors 38, 40, and 42 for phases A, B, and C, respectively, are located between the output of inverter 20 and the input of motor 10. The sensed current $I_A$, $I_B$, and $I_C$, for each respective phase, is passed through an analog-to-digital converter 44, 46, and 48, respectively, and then processed, as more fully described hereinafter, by position estimator 30. Similarly, a D.C. link voltage VDC from inverter 20 is passed through an analog-to-digital converter 50 and then supplied to position estimator 30.

Position estimator 30 includes impedance sensing control logic 52 which selectively activates the various analog-to-digital converters. Control logic 52 also monitors the commutation commands on line 32 and the phase current levels through line 54 to determine which phases are unenergized at different instants of time. A timer 56 is connected to the control logic to facilitate timing operations.

Control logic 52 also provides an electrical signal representative of voltage V to a calculation block 58. This calculation block derives an estimated inductance value $\hat{L}_A$ for phase A, in accordance with equation (6) described above, and provides this value to a function block 60 which, in any known fashion, e.g. a look-up table, ascertains the two estimated rotor angles $\hat{\theta}_{A1}$ and corresponding to the estimated inductance value $\hat{L}_A$. The pair of estimated angles for phase A are then provided to an angle combiner/extrapolator 62.

In the blocks labeled channel B and channel C in FIG. 3, operations similar to those performed by blocks 58 and 60 are performed for phases B and C, respectively, producing a pair of estimated angles and $\hat{\theta}_{B1}$ for phase B and a pair of estimated angles $\hat{\theta}_{C1}$ and $\hat{\theta}_{C2}$ for phase C. The pairs of estimated angles for phases B and C, like those for phase A, are provided to angle combiner/extrapolator 62. The angle combiner/extrapolator, in a manner discussed hereinafter, combines the pairs of estimated angles for the different phases and generates therefrom an instantaneous rotor position for use by controller 18.

In operation, impedance sensing control logic 52 monitors the commutation commands produced by controller 18 and the phase current on line 54 to determine which phases are initially unenergized. Control logic 52 then applies a short duration low level pulse on line 34, which is passed through OR gate 36 to inverter 20, for each unenergized phase. These sensing pulses cause the inverter to switch on the unenergized phases for a very short period of time. The current sensors 38, 40, or 42 associated with each of the respective unenergized phases responds to the start of current flow which, in the previously unenergized phases, begins to rise according to the inductive relationship. After a predetermined time, preset in the control logic, following the start of energization of a previously unenergized phase, the impedance sensing control logic measures the current on each of these phases and then switches the phases off through line 34.

The sensed current at the beginning and end of a sampling interval (during which interval the sensing pulse is applied to the unenergized phases), along with the measured D.C. link voltage V, are processed in calculation block 58 for phase A and in its counterparts in channels B and C, respectively, for phases A, B and C, respectively, to generate an estimated inductance value for each respective unenergized channel. A signal representative of the estimated inductance value for each respective unenergized phase is supplied to function block 60 and its counterparts in channels B and C, respectively, and the two possible rotor positions corresponding to the estimated inductance value are ascertained for each unenergized channel. A signal representative of the pair of estimated angles for each unenergized phase is furnished to angle combiner/extrapolator 62, the operation of which is controlled by impedance sensing control logic 52 through line 64.

Figure 4:
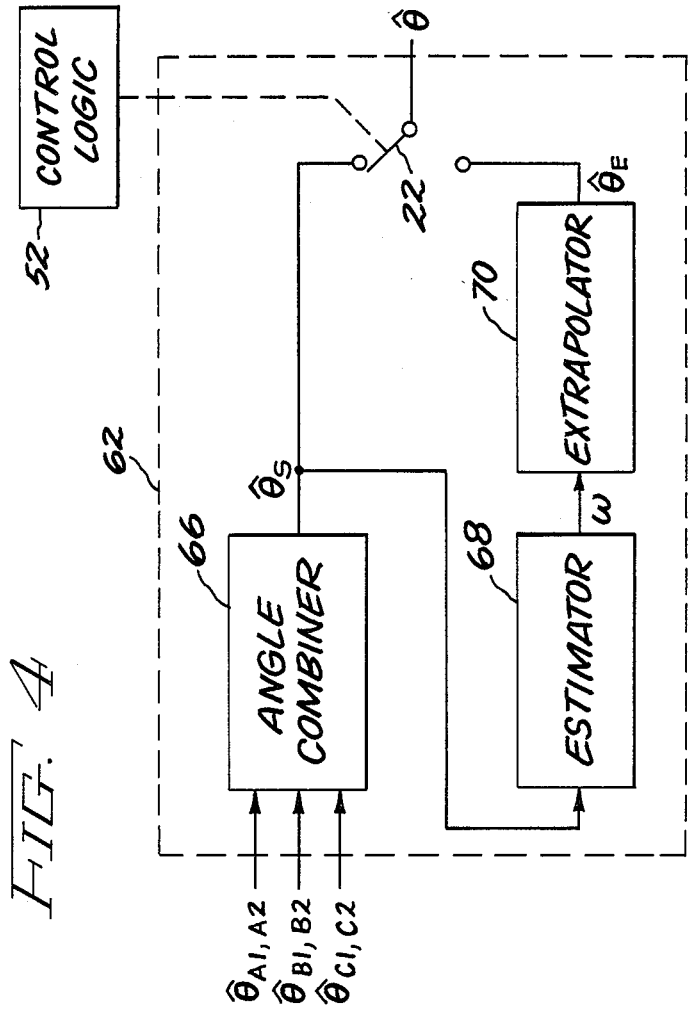
FIG. 4 is a block diagram of an angle combiner and extrapolator useful in implementing the present invention.

Control logic 52 determines the state of each commutation command at the end of the sampling period to determine whether a change of state has occurred on any stator phase during the sampling period. If no change of state has occurred and if two phases have been unenergized throughout the sampling period, an angle combiner 66 (see FIG. 4) in angle combiner/extrapolator 62 combines the estimated angles from the two unener phases to produce a sensed instantaneous rotor position $\hat{\theta}_S$. The angles are combined by first shifting a set of angles for one of the unenergized phases by the known phase displacement between the two phases and then comparing the shifted angles with the set of estimated angles for the second phase to determine which of the angles match. The matching angles define the sensed instantaneous rotor position.

Running in parallel with angle combiner 66 is an estimator 68. The estimator is preferably a recursive least squares estimator with exponential forgetting which essentially keeps track of machine speed ω. The estimator is continuously updated and deletes from memory, or "forgets", old data exponentially. Such estimators are known in the art and described in textbooks and accordingly are not discussed further herein. The output of estimator 68 is provided to extrapolator 70 which, in known fashion, determines an extrapolated rotor position $\hat{\theta}_E$ based upon the previous sensed rotor position and estimated speed and elapsed time. Control logic 52 controls a switch 22 to substitute extrapolated rotor position for sensed rotor position, if a change of state in any phase occurs or if two initially unenergized phases do not remain unenergized throughout the sampling period. The output signal from switch 72 represents the desired instantaneous rotor position $\hat{\theta}$.

The elements of position estimator 30 shown in FIG. 3 are preferably implemented by a single high speed microprocessor such as the TMS 320 from Texas Instruments. A computer program for implementing the process of the present invention follows:

| POSITION ESTIMATOR PROGRAM | |
|---|---|
| Sampling interval is T | Controller firing signal vector is $\underline{X}$ |
| Sampling sense time is $T_1$ | Phase current vector is $\underline{I}$ |
| Cycle | |
| T = 0; | Start the clock |
| read ($\underline{X}_1$); | Read initial controller firing state |
| read ($\underline{I}$); | Read phase currents |
| $\underline{X}_S = f(\underline{I},\underline{X}_1)$; | Determine sense phase set |
| fire ($\underline{X}_S$); | Fire sense phases |
| wait ($T_1$) | Linger here awhile... |
| read ($\underline{I}_S$); | Read sense currents |
| unfire ($\underline{X}_S$); | Turn off sense phases |
| read ($\underline{X}_2$); | Read final controller firing state |
| if $\underline{X}_1 = \underline{X}_2$ then | If state changed, ignore inputs |
| extrapolate (θ); | |
| else | |
| find θ,ω from $\underline{I}_S$; | |
| End if | |
| output (θ); | Provide results |
| wait (T − t); | Wait till next time |
| End | |

A brief description of the above program will now be presented. The process begins by initializing everything and then the controller firing states are read. In essence, which phases the controller has turned on are read, and the phase currents are read. Next, the sense phase set is determined, i.e., which phases are unenergized and accordingly available for sensing. Sensing pulses are thereafter applied to the available phases, a specific interval is waited and then the phase currents are read again. The sensing pulses are next turned off and the final firing states of the controller are read. A change in the controller firing state indicates that one of the phases either turned on or off and that there will be noise in the measurement; accordingly, the sensed readings are ignored and extrapolation is implemented. The "if"

statement dictates that the angle be extrapolated if the initial state and the final state of the controller firing for any phase are not the same; otherwise, the rotor angle position and the speed are found from the sensed current set, a signal representative of the rotor angular position is produced and, after a brief interval, the whole process is repeated.

The following relationship may be used to determine the sensed phase set:

```
Function f(I, X)      Determine sense phase set
Begin
  For j: = 1 to number of phases
    Xs(j) = X(j) = OFF and |I(j)| < tolerance
  END;
END;
```

The criteria that make a phase an element of the sense set are that the phase is turned off, i.e. the controller is not firing, and that the current in that phase is zero or less than some tolerance level. Both of these conditions have to be met to qualify a phase as unenergized. Each phase is checked to see if it qualifies.

The following extrapolation routine may be used to determine a new angle from a previous angle when sensing cannot be used:

```
PROCEDURE EXTRAPOLATE
BEGIN
  θNEW: = θOLD + ω*T    Assume constant velocity
END;
```

The speed, which is designated $\omega$ in this routine, is derived from the least squares estimator.

Finally, a simplified routine for finding $\theta$ from the estimated inductance value of multiple unenergized phases is presented below.

```
Procedure Find θ from L̂
Begin

L̂ = VdT/dI

θest: = θ(L)       Look up possible θ's
  Select correct θ from θest for 2 phases
End
```

From the above, it will be apparent that a new and improved method and apparatus for accurately estimating instantaneous rotor position from the terminals of a switched reluctance motor has been developed. The switched reluctance motor is finding application as a servo drive for aerospace applications due to its simplicity and ruggedness. These applications often require precise position information for closed loop servo control. Eliminating the shaft position sensor from the switched reluctance motor in these applications increases its reliability and decreases its weight, two criteria extremely important to the aerospace industry. In addition, eliminating the shaft position sensor enhances attractiveness of the switched reluctance motor for industrial drive applications, where position sensors add cost and decrease reliability. The position estimator of the present invention accomplishes these objectives and all of the other objects set forth hereinabove.

Although a specific embodiment has been described and depicted herein, it will be appreciated by those skilled in this art that various modifications, substitutions, rearrangements and the like may be made, without departing from the spirit of the invention. By way of example, the start of the sampling period may be delayed slightly after application of the sensing pulse, to avoid eddy current effects. Also, if variations in D.C. link voltage are ignored or remain within an acceptable tolerance, the pair of estimated angles for each unenergized phase can be ascertained directly from the sensed change in current, i.e., without deriving an estimated inductance value. Other variations will occur to those skilled in this art. It is, therefore, to be understood that the claims appended hereto are intended to cover all such modifications and changes which fall within the true spirit and scope of the invention.

What is claimed is:

1. An indirect method for estimating instantaneous rotor position in a switched reluctance motor having multiple stator phases which are energized in synchronism with rotor position, comprising the steps of:
   sensing a change in phase current over a sampling period for each of two initially unenergized stator phases of the motor, said change in phase current resulting from application of a short duration sensing pulse to each of said initially unenergized stator phases;
   ascertaining rotor angles which correspond to the sensed change in phase current for each of said unenergized phases, respectively; and
   determining whether said two phases remain unenergized throughout said sampling period and, if so, determining which of said rotor angles for said two phases match and producing an indication of estimated instantaneous rotor position equal to the matching rotor angle, and, if not, extrapolating from a previous estimated rotor position to provide an extrapolated indication of instantaneous rotor position.

2. The method of claim 1 wherein two rotor angles correspond to the sensed change of current for each of said unenergized phases, respectively, and wherein the step of determining whether said two phases remain unenergized comprises shifting the rotor angles of one phase by the phase displacement between said two phases and then comparing the rotor angles of said two phases to determine which match.

3. The method of claim 2 wherein the extrapolation step comprises a recursive least squares estimation with exponential forgetting process for determining rotor speed.

4. The method of claim 2 wherein the extrapolation step is implemented if any stator phase changes state during said sampling period.

5. The method of claim 1 wherein the duration of said sensing pulse is sufficiently short as to produce a negligible buildup of phase current and negligible motion of the rotor.

6. The method of claim 1, further comprising the step of deriving an estimated inductance value from the sensed change in current for each of said initially unenergized phases; and wherein the step of ascertaining rotor angles comprises ascertaining a pair of rotor angles which correspond to the estimated inductance value for each of said unenergized phases, respectively.

7. Apparatus for estimating instantaneous rotor angular position in a switched reluctance motor having multiple stator phases which are selectively energized in synchronism with rotor position, comprising:

impedance sensing control logic means for determining which of said stator phases are presently unenergized and for applying a short duration sampling pulse to each of said unenergized phases;

current sensing means for sensing a change in current over a defined sampling period for each of said unenergized phases in response to application of the sampling pulse to each of said unenergized phases, respectively;

signal processing means for ascertaining a pair of estimated rotor angles corresponding to the sensed change in current for each of said unenergized phases, respectively; and angle combining means for shifting a pair of estimated angles for one of said unenergized phases by a value equal to a phase displacement of a second one of said unenergized phases and for comparing the shifted pair of estimated angles with the pair of estimated angles for the second one of said unenergized phases to determine which of said angles match, and for producing an indication of estimated instantaneous rotor angular position equal to said matching angle.

8. The apparatus of claim 7 further comprising:

extrapolation means for generating an indication of extrapolated rotor angular position and producing said indication of said extrapolated position in place of the estimated instantaneous position when any of said stator phases undergoes a change in state during the sampling period.

9. The apparatus of claim 8 wherein the indication of said extrapolated position is produced when the two unenergized phases of the motor do not remain unenergized throughout said sampling period.

10. The apparatus of claim 9 wherein said extrapolation means comprises estimator means for estimating rotor speed by a recursive least squares estimation with exponential forgetting process.

11. The apparatus of claim 7 wherein said impedance sensing control logic means monitors a controller firing state and the phase current for a stator phase to determine whether the monitored stator phase is unenergized.

12. The apparatus of claim 9 wherein said signal processing means further comprises means for deriving an estimated inductance value from the sensed change in current for each of the unenergized phases, and wherein the signal processing means ascertains the pair of estimated rotor angles for each unenergized phase in response to the estimated inductance value for said each unenergized phase, respectively.

13. The apparatus of claim 12 in combination with a controller for receiving the indication of rotor angular position output from the apparatus and producing commutation signals; and an inverter for receiving said commutation signals and for providing phase drive signals to the motor.

14. The apparatus of claim 13 wherein said commutation signals are also provided to the impedance sensing control logic means, said apparatus further comprising OR gate means for receiving and OR-gating the commutation signals and the sampling pulses to said inverter, and timer means for defining said sampling period.

15. The apparatus of claim 8 wherein the impedance sensing control logic means, the signal processing means, the angle combiner means and the extrapolation means are all implemented within a microprocessor.

* * * * *